(12) United States Patent
Choi et al.

(10) Patent No.: US 11,476,992 B2
(45) Date of Patent: Oct. 18, 2022

(54) METHOD FOR TRANSMITTING AND RECEIVING SRS, AND COMMUNICATION APPARATUS THEREFOR

(71) Applicant: LG Electronics Inc., Seoul (KR)

(72) Inventors: Kukheon Choi, Seoul (KR); Jiwon Kang, Seoul (KR); Kyuseok Kim, Seoul (KR); Jonghyun Park, Seoul (KR); Kilbom Lee, Seoul (KR)

(73) Assignee: LG Electronics Inc., Seoul (KR)

(*) Notice: Subject to any disclaimer, the term of this patent is extended or adjusted under 35 U.S.C. 154(b) by 27 days.

(21) Appl. No.: 16/759,419

(22) PCT Filed: Nov. 15, 2018

(86) PCT No.: PCT/KR2018/014011
§ 371 (c)(1),
(2) Date: Jul. 30, 2020

(87) PCT Pub. No.: WO2019/098712
PCT Pub. Date: May 23, 2019

(65) Prior Publication Data
US 2020/0366439 A1 Nov. 19, 2020

Related U.S. Application Data

(60) Provisional application No. 62/587,400, filed on Nov. 16, 2017.

(51) Int. Cl.
*H04L 5/00* (2006.01)
*H04B 1/692* (2011.01)

(52) U.S. Cl.
CPC .......... *H04L 5/0051* (2013.01); *H04B 1/692* (2013.01)

(58) Field of Classification Search
CPC ..... H04L 5/0051; H04L 5/0012; H04B 1/692; H04J 11/005; H04J 2211/001
See application file for complete search history.

(56) References Cited

U.S. PATENT DOCUMENTS

| 2012/0113908 | A1  | 5/2012 | Jen |
|---|---|---|---|
| 2014/0211736 | A1* | 7/2014 | Noh .................. H04W 56/0005 370/329 |
| 2015/0085787 | A1* | 3/2015 | Ouchi .................. H04L 5/0037 370/329 |

FOREIGN PATENT DOCUMENTS

KR  1020160119138 A  10/2016

OTHER PUBLICATIONS

ZTE, Sanechips, "Discussion on SRS design for NR", 3GPP TSG RAN WG1 Meeting 90bis, Oct. 9-13, 2017, R1-1717435.
(Continued)

*Primary Examiner* — Sam K Ahn
*Assistant Examiner* — Amneet Singh
(74) *Attorney, Agent, or Firm* — Dentons US LLP

(57) ABSTRACT

A method for transmitting a sounding reference signal (SRS) by a terminal comprises the steps of: receiving, from a base station, the number of SRS repetition symbols, group hopping patterns, sequence hopping patterns, pattern selection information, and hopping selection information; generating an SRS sequence by applying a group hopping pattern and a sequence hopping pattern selected according to the pattern selection information and the hopping selection information; and transmitting the SRS on the basis of the SRS sequence, wherein the group hopping patterns include a group hopping pattern calculated using the number of SRS repetition symbols, the sequence hopping patterns include a sequence hopping pattern calculated using the number of SRS repeti- (Continued)

tion symbols, and the hopping selection information selects whether to activate group hopping and sequence hopping.

15 Claims, 9 Drawing Sheets

(56) References Cited

OTHER PUBLICATIONS

Ericsson, "Details on SRS design", 3GPP TSG-RAN WG1 #90bis, Oct. 9-13, 2017, R1-1718450.
Mitsubishi Electric, "Views on SRS designs", 3GPP TSG RAN WG1 #90b, Oct. 9-13, 2017, R1-1718467.
Nokia, Nokia Shanghai Bell, "Remaining details on SRS design in NR", 3GPP TSG RAN WG1 Meeting #90bis, Oct. 9-13, 2017, R1-1718518.
Ericsson, Qualcomm, Huawei, HiSilicon, ZTE, Sanechips, Mitsubishi, Sony, Nokia, NSB, NTT Docomo, AT&T, China Unicom, China Telecom, Vodafone, Intel, Samsung, Verizon, etc., "WF on SRS for NR", 3GPP TSG RAN WG1 Meeting #90b, Oct. 9-13, 2017, R1-1718968.

* cited by examiner

[FIG. 1]
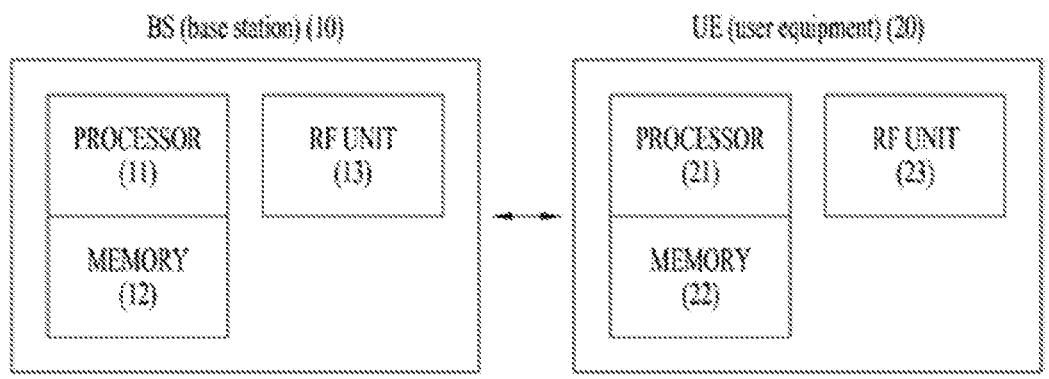

[FIG. 2a]
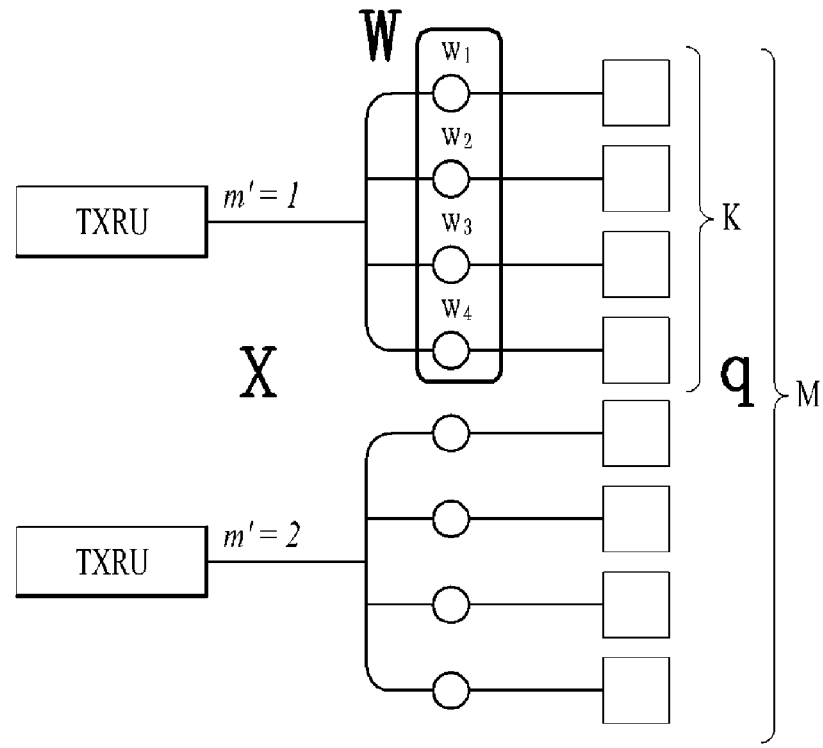
[FIG. 2b]
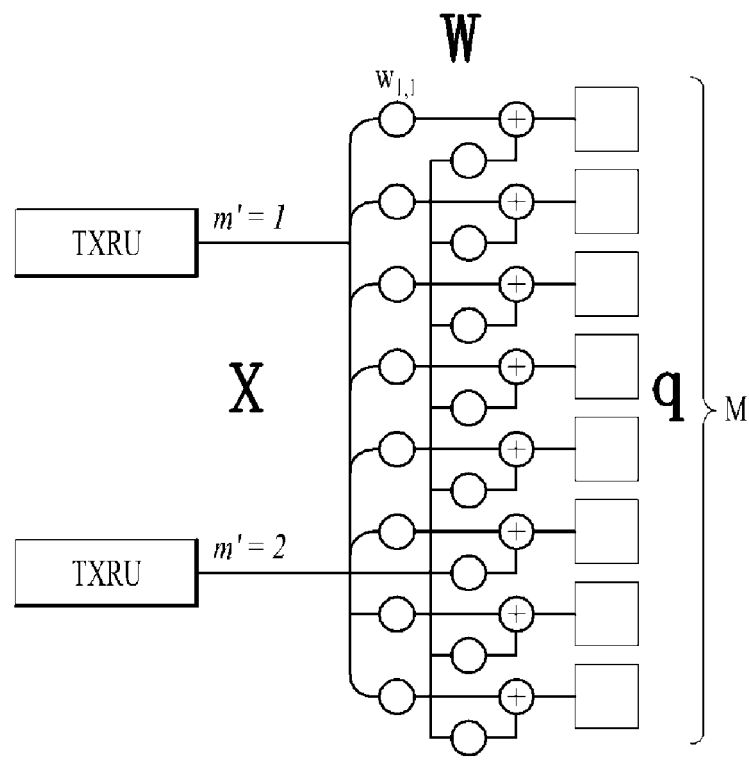

[FIG. 3]
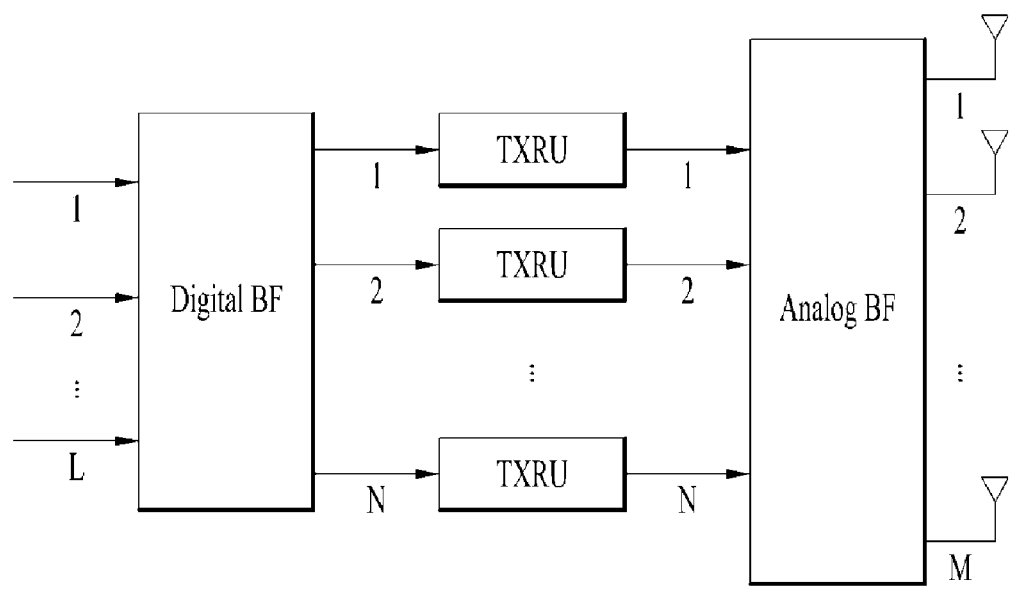

[FIG. 4]
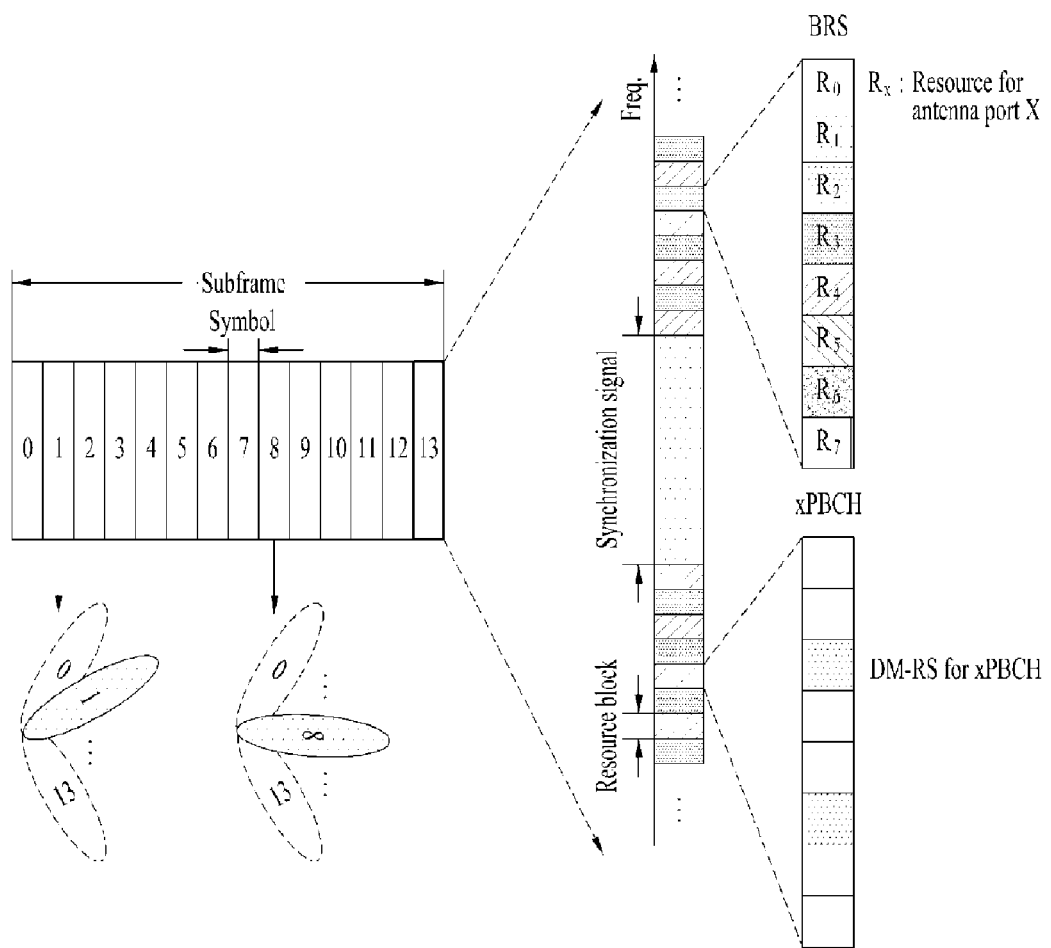

[[FIG. 5]]
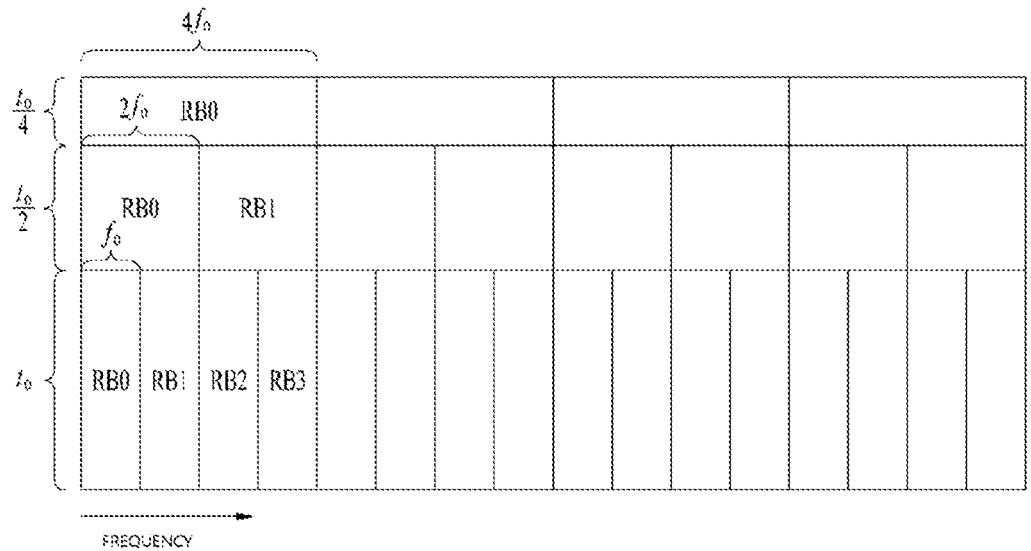
[FIG. 6]
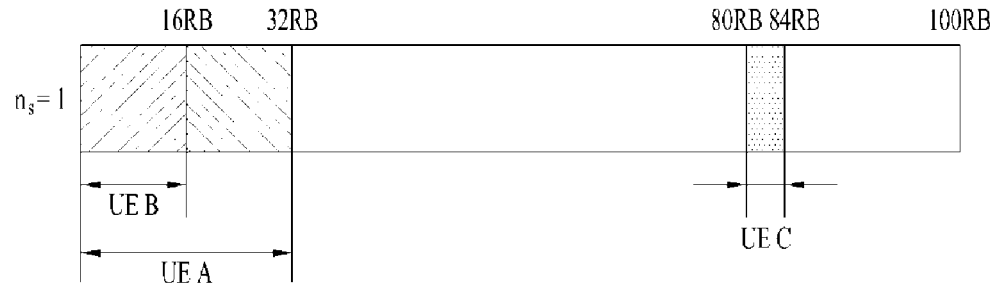
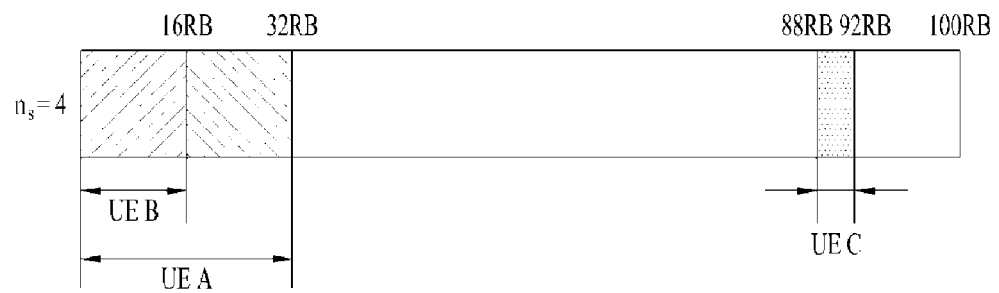

[FIG. 7]
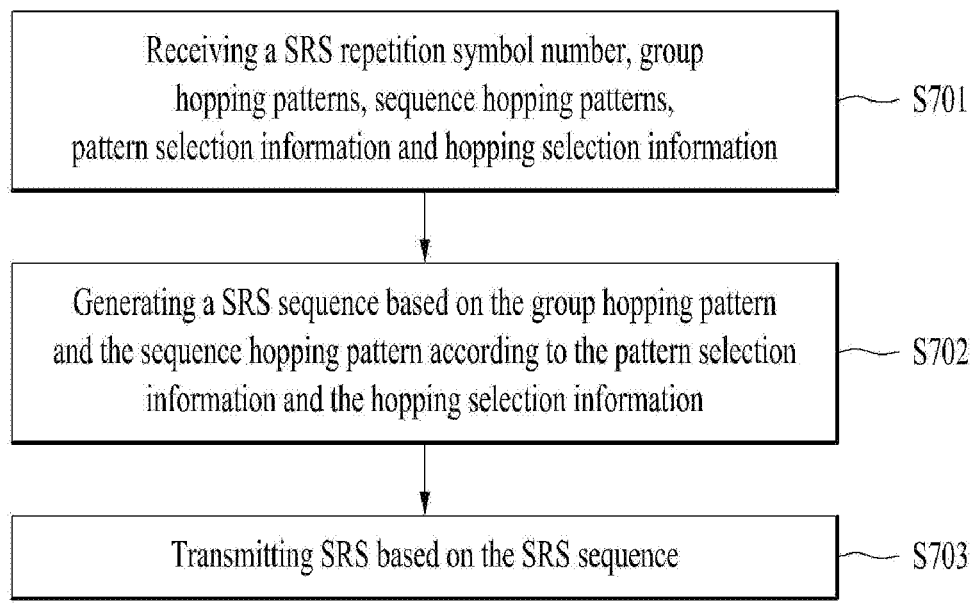

[FIG. 8]
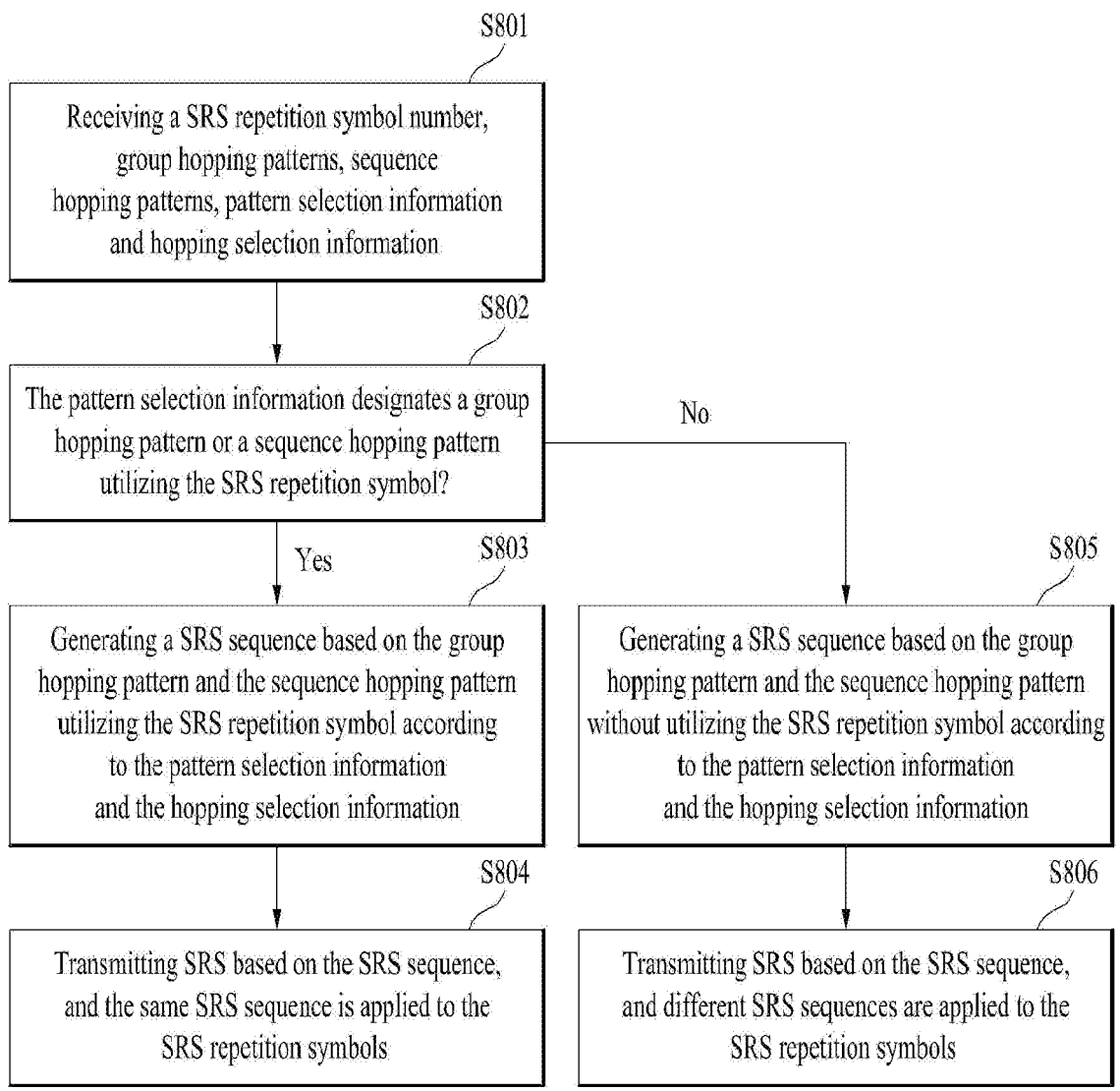

[FIG. 9]
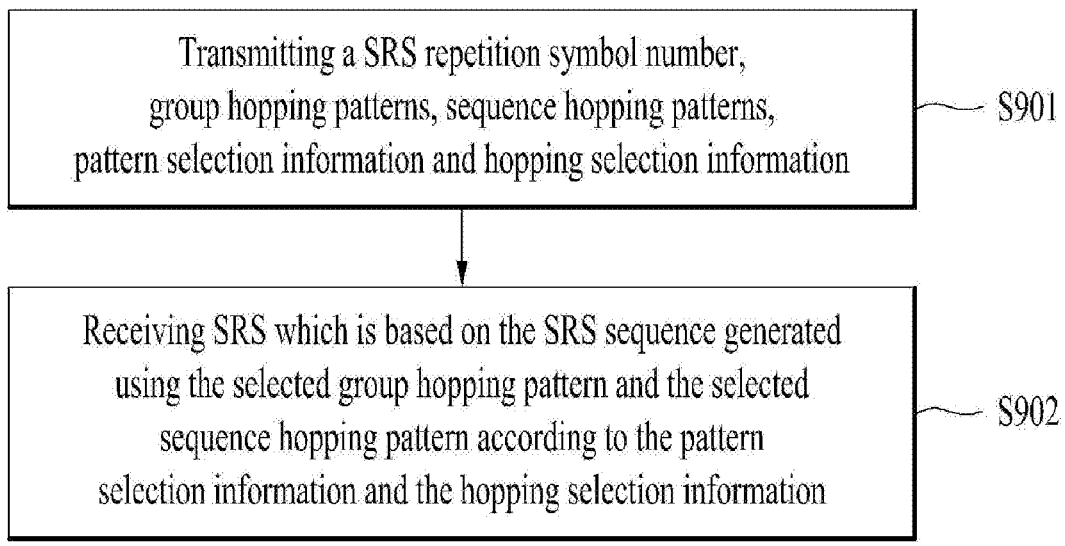

[FIG. 10]
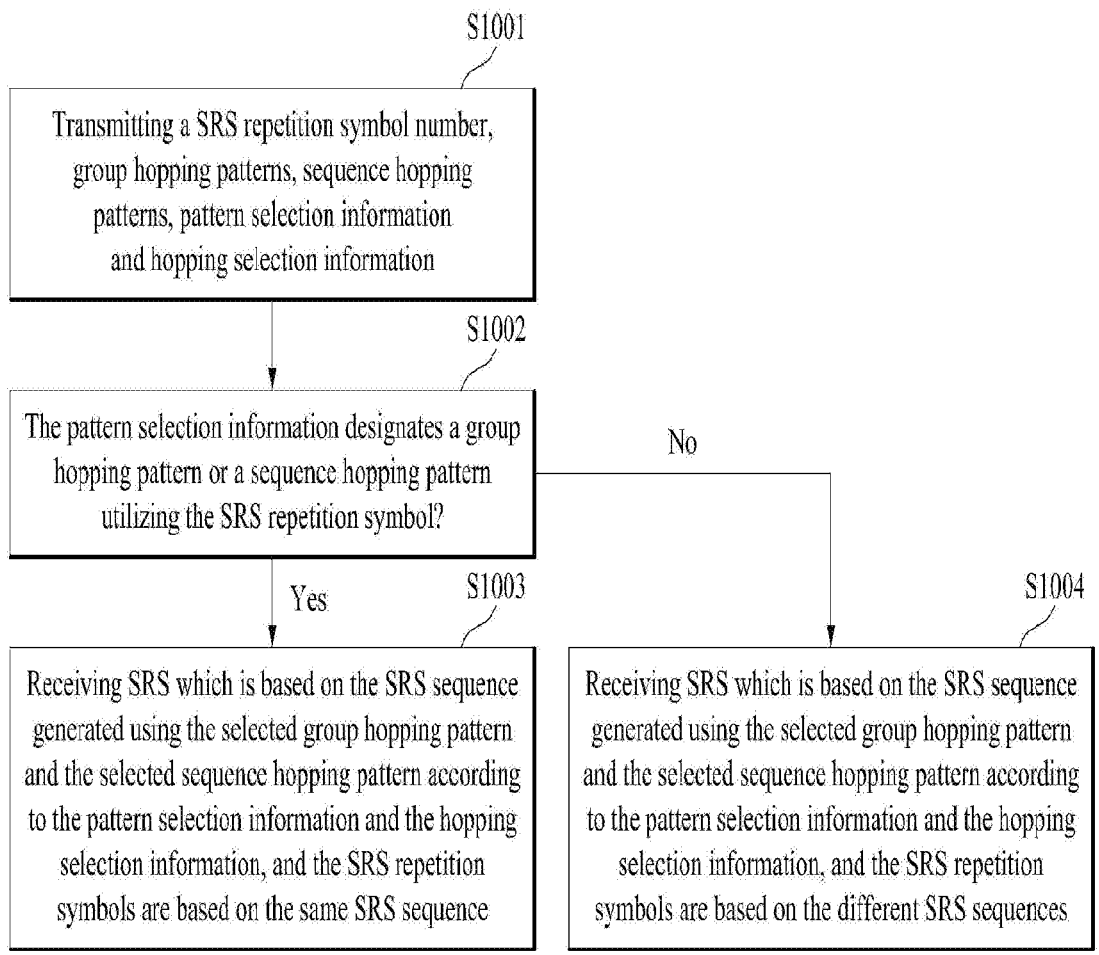

METHOD FOR TRANSMITTING AND RECEIVING SRS, AND COMMUNICATION APPARATUS THEREFOR

TECHNICAL FIELD

The present disclosure relates to a wireless communication system, and more particularly, to methods for transmitting and receiving a sounding reference signal (SRS) and communication devices therefor.

BACKGROUND ART

When a new radio access technology (RAT) system is introduced, as more and more communication devices require larger communication capacity, there is a need for improved mobile broadband communication as compared to existing RAT.

In addition, massive machine type communications (MTC) connected to a plurality of devices and things to provide various services anytime and anywhere is one of main issues to be considered in next-generation communication. In addition, communication system design considering services/UEs sensitive to reliability and latency has been discussed. As such, New RAT will provide services considering enhanced mobile broadband communication (eMBB), massive MTC (mMTC), URLLC (Ultra-Reliable Low-Latency Communication), etc. In a next-generation 5G system, scenarios may be divided into Enhanced Mobile Broadband (eMBB)/Ultra-reliable Machine-Type Communications (uMTC)/Massive Machine-Type Communications (mMTC), etc. eMBB is a next-generation mobile communication scenario having high spectrum efficiency, high user experienced data rate, high peak data rate, etc., uMTC is a next-generation mobile communication scenario having ultra-reliability, ultra-low latency, ultra-high availability, etc. (e.g., V2X, emergency service, remote control), and mMTC is a next-generation mobile communication scenario having low cost, low energy, short packet, and massive connectivity (e.g., IoT).

DISCLOSURE

Technical Problem

An object of the present disclosure is to provide a method of transmitting an SRS by a user equipment (UE).

Another object of the present disclosure is to provide a method of receiving an SRS by a base station (BS).

Another object of the present disclosure is to provide a UE for transmitting an SRS.

Another object of the present disclosure is to provide a BS for receiving an SRS.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an aspect of the present disclosure, provided herein is a method of transmitting a sounding reference signal (SRS) by a user equipment (UE), including receiving the number of SRS repetition symbols, group hopping patterns, sequence hopping patterns, pattern selection information, and hopping selection information from a base station (BS); generating an SRS sequence by applying a group hopping pattern and a sequence hopping pattern selected according to the pattern selection information and the hopping selection information; and transmitting the SRS based on the SRS sequence, wherein the group hopping patterns include a group hopping pattern calculated using the number of SRS repetition symbols, the sequence hopping patterns include a sequence hopping pattern calculated using the number of SRS repetition symbols, and the hopping selection information selects enabling or disabling of group hopping and sequence hopping.

The hopping selection information may select enabling of only one of the group hopping and the sequence hopping.

The pattern selection information may select the group hopping pattern calculated using the number of SRS repetition symbols and the same SRS sequence may be applied to the SRS repetition symbols.

The pattern selection information may select the sequence hopping pattern calculated using the number of SRS repetition symbols and the same SRS sequence is applied to the SRS repetition symbols.

The pattern selection information may skip selecting the group hopping pattern calculated using the number of SRS repetition symbols and the sequence hopping pattern calculated using the number of SRS repetition symbols and different SRS sequences may be applied to the SRS repetition symbols.

According to another aspect of the present disclosure, provided herein is a method of receiving a sounding reference signal (SRS) by a base station (BS), including transmitting the number of SRS repetition symbols, group hopping patterns, sequence hopping patterns, pattern selection information, and hopping selection information to a user equipment (UE); and receiving the SRS based on an SRS sequence generated by applying a group hopping pattern and a sequence hopping pattern selected according to the pattern selection information and the hopping selection information, wherein the group hopping patterns include a group hopping pattern calculated using the number of SRS repetition symbols, the sequence hopping patterns include a sequence hopping pattern calculated using the number of SRS repetition symbols, and the hopping selection information selects enabling or disabling of group hopping and sequence hopping.

Advantageous Effects

According to an embodiment of the present disclosure, symbol repetition parameters are considered to generate an SRS sequence so that an effect of inter-cell interference randomization between SRS symbols, between repetition symbols, or between slots may be obtained.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the disclosure, illustrate embodiments of the disclosure and together with the description serve to explain the principle of the disclosure.

FIG. 1 is a diagram illustrating a wireless communication system for implementing the present disclosure.

FIG. 2*a* is a diagram illustrating TXRU virtualization model option 1 (sub-array model) and FIG. 2*b* is a diagram illustrating TXRU virtualization model option 2 (full connection model).

FIG. 3 is a block diagram for hybrid beamforming.

FIG. 4 is a diagram illustrating beams mapped to BRS symbols in hybrid beamforming.

FIG. 5 is a diagram illustrating symbol/sub-symbol alignment between different numerologies.

FIG. 6 is a diagram illustrating an LTE hopping pattern.

FIG. 7 is a block diagram illustrating an SRS transmission procedure of a UE according to an embodiment of the present disclosure.

FIG. 8 is a block diagram illustrating an SRS transmission procedure of a UE according to another embodiment of the present disclosure.

FIG. 9 is a block diagram illustrating an SRS reception procedure of a BS according to an embodiment of the present disclosure.

FIG. 10 is a block diagram illustrating an SRS reception procedure of a BS according to another embodiment of the present disclosure.

BEST MODE

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP), gNode B and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present disclosure. And, the use of the specific terminology can be modified into another form within the scope of the technical idea of the present disclosure.

FIG. 1 is a diagram illustrating a wireless communication system for implementing the present disclosure.

Referring to FIG. 1, the wireless communication system includes a base station (BS) 10 and one or more UEs 20. On DL, a transmitter may be a part of the BS and a receiver may be a part of the UEs 20. On UL, the BS 10 may include a processor 11, a memory 12, and a radio frequency (RF) unit 13 (a transmitter and a receiver). The processor 11 may be configured to implement the proposed procedures and/or methods disclosed in the present application. The memory 12 is coupled to the processor 11 to store a variety of information for operating the processor 11. The RF unit 13 is coupled to the processor 11 to transmit and/or receive a radio signal. The UE 20 may include a processor 21, a memory 22, and an RF unit 23 (a transmitter and a receiver). The processor 21 may be configured to implement the proposed procedures and/or methods disclosed in the present application. The memory 22 is coupled to the processor 21 to store a variety of information for operating the processor 21. The RF unit 23 is coupled to the processor 21 to transmit and/or receive a radio signal. Each of the BS 10 and/or the UE 20 may have a single antenna or multiple antennas. When at least one of the BS 10 and the UE 20 has multiple antennas, the wireless communication system may be called a multiple input multiple output (MIMO) system.

In the present specification, while the processor 21 of the UE and the processor 11 of the BS perform operations of processing signals and data, except for a function of receiving and transmitting signals, performed respectively by the UE 20 and the BS 10, and a storage function, the processors 11 and 21 will not be particularly mentioned hereinbelow, for convenience of description. Although the processors 11 and 21 are not particularly mentioned, it may be appreciated that operations such as data processing other than signal reception or transmission may be performed by the processors 11 and 21.

Layers of a radio interface protocol between the UE 20 and the BS 10 of the wireless communication system (network) may be classified into a first layer L1, a second layer L2, and a third layer L3, based on 3 lower layers of open systems interconnection (OSI) model well known in communication systems. A physical layer belongs to the first layer and provides an information transfer service via a physical channel. A radio resource control (RRC) layer belongs to the third layer and provides control radio resources between the UE and the network. The UE 10 and the BS 20 may exchange RRC messages with each other through the wireless communication network and the RRC layers.

Sequence Hopping in LTE

A root value is distinguishably configured as a group hopping number u and a sequence hopping number v:

$$q = \lfloor \bar{q} + \frac{1}{2} \rfloor + v \cdot (-1)^{\lfloor 2\bar{q} \rfloor}$$

$$\bar{q} = N_{ZC}^{RS} \cdot (u+1)/31$$

The sequence group number u in slot $n_s$ is defined by a group hopping pattern $f_{gh}(ns)$ and a sequence-shift pattern $f_{ss}$ according to $$u = (f_{gh}(n_s) + f_{ss}) \mod 30$$

There are 17 different hopping patterns and 30 different sequence-shift patterns. Sequence-group hopping may be enabled or disabled by cell-specific parameter Group-hopping-enabled provided by higher layers. Sequence-group hopping for a PUSCH may be disabled for a certain UE through higher-layer parameter Disable-sequence-group-hopping although sequence-group hopping is enabled on a cell basis, unless PUSCH transmission corresponds to a random access response grant or retransmission of the same transport block as part of a contention-based random access procedure.

The group hopping pattern $f_{gh}(ns)$ may be different for a PUSCH, a PUCCH, and an SRS and is given by $$f_{gh}(n_s) = \begin{cases} 0 & \text{if group hopping is disabled} \\ \left( \sum_{i=0}^{7} c(8n_s + i) \cdot 2^i \right) \mod 30 & \text{if group hopping is enabled} \end{cases}$$

where a pseudo-random sequence c(i) is defined in clause 7.2. A pseudo-random sequence generator is initialized with $$c_{init} = \left\lfloor \frac{n_{ID}^{RS}}{30} \right\rfloor$$

at the beginning of each radio frame and $n_{ID}^{RS}$ is given in clause 5.5.1.5.

For an SRS, the sequence-shift pattern $f_{ss}^{SRS}$ is given by $f_{ss}^{SRS} = n_{ID}^{RS} \mod 30$ where $n_{ID}^{RS}$ is given by clause 5.5.1.5.

Sequence hopping is applied only to reference signals of length $M_{sc}^{RS} \geq 6 N_{sc}^{RB}$.

For the reference signals of length $M_{sc}^{RS} < 6 N_{sc}^{RB}$, a base sequence number within a base sequence group is given by v=0.

For the reference signals of length $M_{sc}^{RS} \geq 6 N_{sc}^{RB}$, the base sequence number v within the base sequence group in slot ns is given by $$v = \begin{cases} c(n_s) & \text{if group hopping is disabled and sequence hopping is enabled} \\ 0 & \text{otherwise} \end{cases}$$

where the pseudo-random sequence c(i) is given by clause 7.2. Parameter sequence-hopping-enabled provided by higher layers determines whether sequence hopping is enabled or not.

For the SRS, the pseudo-random sequence generator c(i) is initialized with $$c_{init} = \left\lfloor \frac{n_{ID}^{RS}}{30} \right\rfloor \cdot 2^5 + (n_{ID}^{RS} + \Delta_{ss}) \mod 30$$

at the beginning of each radio frame where $n_{ID}^{RS}$ is given in clause 5.5.1.5., $\Delta_{ss}$ is given in clause 5.5.1.3., and $\Delta_{ss} \in \{0, 1, \ldots, 29\}$ is cell-specifically configured by higher layers.

In sounding reference signals, $N_{ID}^{RS} = N_{ID}^{cell}$.

Generation of Pseudo-Random Sequence in LTE

Pseudo-random sequences are defined by a length-31 Gold sequence. An output sequence c(n) of length $M_{PN}$, where n=0,1, ..., MPN−1, is given by $$c(n) = (x_1(n+N_c) + x_2(n+N_c)) \mod 2$$

$$x_1(n+31) = (x_1(n+3) + x_1(n)) \mod 2$$

$$x_2(n+31) = (x_2(n+3) + x_2(n+2) + x_2(n+1) + x_2(n)) \mod 2$$

where $N_C = 1600$ and the first m-sequence is initialized with $x_1(0)=1$, $x_1(n)=0$, n=1,2, ..., 30. The initialization of the second m-sequence is denoted by $c_{init} = \sum_{i=0}^{30} x_2(i) \cdot 2^i$ with a value depending on application of the sequence.

Analog Beamforming

In a millimeter wave (mmW) system, since a wavelength becomes shorter, a plurality of antenna elements may be installed in the same area. That is, considering that the wavelength at a band of 30 GHz is 1 cm, a total of 64 (8×8) antenna elements may be installed in a 4*4 cm panel at intervals of 0.5 lambda (wavelength) in the case of a 2-dimensional array. Therefore, in the mmW system, it is possible to improve coverage or throughput by increasing beamforming (BF) gain using multiple antenna elements.

In this case, each antenna element may include a transceiver unit (TXRU) to enable adjustment of transmit power and phase per antenna element. By doing so, each antenna element may perform independent beamforming per frequency resource. However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

As an intermediate form of digital BF and analog BF, hybrid BF with B TXRUs that are fewer than Q antenna elements may be considered. In the case of the hybrid BF, the number of beam directions that may be transmitted at the same time is limited to B or less, which depends on how B TXRUs and Q antenna elements are connected.

FIG. 2a is a diagram illustrating TXRU virtualization model option 1 (sub-array model) and FIG. 2b is a diagram illustrating TXRU virtualization model option 2 (full connection model).

FIGS. 2a and 2b show representative examples of a method of connecting TXRUs and antenna elements. Here, the TXRU virtualization model shows a relationship between TXRU output signals and antenna element output signals. FIG. 2a shows a method of connecting TXRUs to sub-arrays. In this case, one antenna element is connected to one TXRU. In contrast, FIG. 2b shows a method of connecting all TXRUs to all antenna elements. In this case, all antenna elements are connected to all TXRUs. In FIGS. 2a and 2b, W indicates a phase vector weighted by an analog phase shifter. That is, W is a major parameter determining the direction of the analog beamforming. In this case, the mapping relationship between channel state information-reference signal (CSI-RS) antenna ports and TXRUs may be 1-to-1 or 1-to-many.

Hybrid Beamforming

FIG. 3 is a block diagram for hybrid beamforming.

If a plurality of antennas is used in a new RAT system, a hybrid beamforming scheme which is a combination of digital beamforming and analog beamforming may be used. At this time, analog beamforming (or RF beamforming) means operation of performing precoding (or combining) at an RF stage. In the hybrid beamforming scheme, each of a baseband stage and an RF stage uses a precoding (or combining) method, thereby reducing the number of RF chains and the number of D/A (or A/D) converters and obtaining performance similar to performance of digital beamforming. For convenience of description, as shown in FIG. 4, the hybrid beamforming structure may be expressed by N transceivers (TXRUs) and M physical antennas. Digital beamforming for L data layers to be transmitted by a transmission side may be expressed by an N×L matrix, N digital signals are converted into analog signals through TXRUs and then analog beamforming expressed by an M×N matrix is applied.

FIG. 3 shows a hybrid beamforming structure in terms of the TXRUs and physical antennas. At this time, in FIG. 3, the number of digital beams is L and the number of analog beams is N. Further, in the new RAT system, a BS is designed to change analog beamforming in symbol units, thereby supporting more efficient beamforming for a UE located in a specific region. Furthermore, in FIG. 3, when N TXRUs and M RF antennas are defined as one antenna panel, up to a method of introducing a plurality of antenna panels, to which independent hybrid beamforming is applicable, is being considered in the new RAT system.

When the BS uses a plurality of analog beams, since an analog beam which is advantageous for signal reception may differ between UEs, the BS may consider beam sweeping operation in which the plurality of analog beams, which will be applied by the BS in a specific subframe (SF), is changed according to symbol with respect to at least synchronization signals, system information, paging, etc. such that all UEs have reception opportunities.

FIG. 4 is a diagram illustrating beams mapped to BRS symbols in hybrid beamforming.

FIG. 4 shows the beam sweeping operation with respect to synchronization signals and system information in a downlink (DL) transmission procedure. In FIG. 4, a physical resource (or physical channel) through which the system information of the new RAT system is transmitted in a broadcast manner is named xPBCH (physical broadcast channel). At this time, analog beams belonging to different antenna panels may be simultaneously transmitted within one symbol, and, in order to measure a channel per analog beam, as shown in FIG. 4, a method of introducing a beam reference signal (BRS) which is an RS transmitted by applying a single analog beam (corresponding to a specific analog panel) may be considered. The BRS may be defined with respect to a plurality of antenna ports and each antenna port of the BRS may correspond to a single analog beam. Although the RS used to measure the beam is given BRS in FIG. 5, the RS used to measure the beam may be named another name. At this time, unlike the BRS, a synchronization signal or xPBCH may be transmitted by applying all analog beams of an analog beam group, such that an arbitrary UE properly receives the synchronization signal or xPBCH.

Features of NR Numerology

In NR, a method of supporting scalable numerology is being considered. That is, a subcarrier spacing of NR is represented as (2n×15) kHz, where n is an integer. From a nested viewpoint, a subset or a superset (at least 15, 30, 60, 120, 240, and 480 kHz) of the above subcarrier spacing is being considered as a main subcarrier spacing. Symbol or sub-symbol alignment between different numerologies has been configured to be supported by performing control to have the same cyclic prefix (CP) overhead ratio according to a subcarrier spacing. FIG. 5 is a diagram illustrating symbol/subsymbol alignment between different numerologies.

In addition, numerology is determined to have a structure for dynamically allocating time/frequency granularity according to services (eMMB, URLLC, and mMTC) and scenarios (high speed, etc.).

The following main agreements are made in new RAT (NR).

A maximum bandwidth allocated per NR carrier is 400 MHz.

Details of up to 100 MHz are specified in standard specification Rel 15.

Scalable numerology is adopted. That is, 15 kHz*(2n) (15 to 480 kHz) is used.

One numerology has one subcarrier spacing (SCS) and one CP. Each SCS and CP are configured by RRC.

A subframe has a fixed length of 1 ms (a transmission time interval (TTI) is a unit of a slot (14 symbols), a mini-slot (in the case of URLLC), or a multi-slot depending on the SCS or purpose (e.g., URLLC), and the TTI is also configured by RRC signaling (one TTI duration determines how transmission is made on a physical layer)).

That is, all numerologies are aligned every 1 ms.

The number of subcarriers in each resource block (RB) is fixed to 12.

The number of symbols in a slot is 7 or 14 (when an SCS is lower than 60 kHz) and 14 (when an SCS is higher than 60 kHz).

NR PUCCH Formats

Physical uplink control channel (PUCCH) formats may be classified according to duration/payload size.

A short PUCCH has format 0 (<=2 bits), format 2 (>2 bits)

A long PUCCH has format 1 (<=2 bits), format 3 (>2, [>N] bits), or format 4 (2>2, [<=N] bits).

In regard to a PUCCH, a transmit diversity scheme is not supported in Rel-15.

Simultaneous transmission of a PUSCH and PUCCH by the UE is not supported in Rel-15.

TABLE 1

| Format | PUCCH length in OFDM symbols | Number of bits | [Usage] | Etc. |
|---|---|---|---|---|
| 0 | 1-2 | <=2 | HARQ, SR | Sequence selection |
| 1 | 4-14 | <=2 | HARQ, [SR] | Sequence modulation (BPSK, QPSK) |
| 2 | 1-2 | >2 | HARQ, CSI, [SR] | [CP-OFDM] |
| 3 | 4-14 | [>N] | HARQ, CSI, [SR] | DFT-s-OFDM (no UE multiplexing) |
| 4 | 4-14 | >2, [<=N] | HARQ, CSI, [SR] | DFT-s-OFDM (Pre DFT OCC) |

Features of SRS Hopping in LTE System
- SRS hopping is performed only in the case of periodic SRS triggering (i.e., triggering type 0).
- Allocation of SRS resources is given by a predefined hopping pattern.
- A hopping pattern may be UE-specifically configured through RRC signaling (however, overlapping is not allowed).
- The SRS is hopped in the frequency domain by applying a hopping pattern to each subframe in which a cell/UE-specific SRS is transmitted.
- An SRS starting location and hopping formula in the frequency domain are defined by Equation 1 below.

[Equation 1]

$$k_0^{(p)} = \bar{k}_0^{(p)} + \sum_{b=0}^{B_{SRS}} K_{TC} M_{sc,b}^{RS} n_b$$

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases}$$

$$F_b(n_{SRS}) = \begin{cases} (N_b/2) \left\lfloor \frac{n_{SRS} \bmod \Pi_{b'=b_{hop}}^b N_{b'}}{\Pi_{b'=b_{hop}}^{b-1} N_{b'}} \right\rfloor + \left\lfloor \frac{n_{SRS} \bmod \Pi_{b'=b_{hop}}^b N_{b'}}{2\Pi_{b'=b_{hop}}^{b-1} N_{b'}} \right\rfloor & \text{if } N_b \text{ even} \\ \lfloor N_b/2 \rfloor \lfloor n_{SRS}/\Pi_{b'=b_{hop}}^{b-1} N_{b'} \rfloor & \text{if } N_b \text{ odd} \end{cases}$$

$$n_{SRS} = \begin{cases} 2N_{SP}n_f + 2(N_{SP}-1)\lfloor \frac{n_s}{10} \rfloor + \lfloor \frac{T_{offset}}{T_{offset\_max}} \rfloor, & \text{for 2 ms SRS periodicity of frame structure type 2} \\ \lfloor (n_f \times 10 + \lfloor n_s/2 \rfloor)/T_{SRS} \rfloor, & \text{otherwise} \end{cases}$$

where $n_{SRS}$ denotes a hopping interval in the time domain, $N_b$ denotes the number of branches allocated to a tree level b, and b may be determined by setting $B_{SRS}$ in dedicated RRC.

FIG. 6 is a diagram illustrating an LTE hopping pattern (ns=1→ns=4).

An example of configuring the LTE hopping pattern will now be described.

LTE hopping pattern parameters may be set through cell-specific RRC signaling. For NUL example, $C_{SRS}=1$, $N_{RB}^{UL}=100$, $n_f=1$, and $n_s=1$ may be configured.

Next, the LTE hopping pattern parameters may be configured through UE-specific RRC signaling. For example, $B_{SRS}=1$, $b_{hop}=0$, $n_{RRC}=22$, and $T_{SRS}=10$ may be configured for UE A; $B_{SRS}=2$, $b_{hop}=0$, $n_{RRC}=10$, and $T_{SRS}=5$ may be configured for UE B; and $B_{SRS}=3$, $b_{hop}=2$, $n_{RRC}=23$, and $T_{SRS}=2$ may be configured for UE C.

Features of NR Antenna Switching

In NR, inter-slot and intra-slot antenna switching is supported. For intra-slot antenna switching, a guard period may be configured. In the case of 1T2R (or 1Tx2Rx) and 2T4R (or 2Tx4Rx), the UE is configured with two SRS resources each corresponding to one symbol or two symbols. In the case of 1T4R (or 1Tx4Rx), the UE is configured with 4 SRS resources each corresponding to a single symbol and a single port. Each port of the configured resources is associated with a different UE antenna.

The difference between an LTE SRS and an NR SRS is as follows (except for UpPTS configuration). Here, the relationship between a sequence and a resource of the NR SRS has not been determined yet.

In LTE (cell specific), the number of SRS symbols is 1, an SRS position is the 14th symbol of a subframe, and a sequence of SRS symbols is characterized in that the sequence is generated with a single slot index and a sequence hopping operation is performed. For sequence hopping initialization, a scrambling seed using a cell ID is employed.

In NR (UE specific), the number of SRS symbols is 1, 2, or 4, the SRS position is configured within the last 6 symbols, and a sequence of SRS symbols is characterized in that the same sequence may be configured during transmission of one resource over multiple symbols, sequences may be changed depending on SRS symbols, SRS resources provided to one UE may use the same sequence, difference sequences may be applied to resources, or resources in a resource group may use the same sequence or difference sequences. For sequence hopping initialization, various combinations of a cell ID, a UE ID, an SRS resource ID, etc. are possible.

The NR SRS are supposed to support a symbol repetition parameter R of a resource.

Accordingly, sequence generation should be supported such that strong inter-cell interference may not occur according to the following case of SRS resource allocation in which: i) SRS sequences in one slot are equal, ii) sequence hopping is applied to every SRS symbol in one slot, iii) sequence hopping is applied in consideration of repetition symbols (using the same sequence) in one slot, iv) sequence hopping is applied to every SRS resource in one slot, v) the same sequence is used when the same resource spans multiple SRS symbols, vi) different sequences are used in every symbol although the same resource spans multiple SRS symbols, vii) different sequences are applied to SRS resources, viii) the same sequence is applied to SRS resources allocated to one UE, ix) the same sequence is applied within an SRS resource group, or x) different sequences are applied to SRS resource groups.

Agreements related to an NR SRS ID are given below (RAN1 #89).

Agreements:
Support SRS sequence ID to generate SRS sequences where SRS sequence ID is UE specifically configured using
RRC.
FFS: UE specific ID (example: C-RNTI) which can be overwritten by RRC signaling.
FFS: for combination of RRC and DCI.
Root(s) of Zadoff-Chu based sequence(s) of an SRS sequence is at least a function of SRS sequence ID.
FFS on details of the function.

Examples:
The function is parameterized only by SRS sequence ID.
The function is parameterized by SRS sequence ID, length of SRS sequence. SRS sequence scheduled time.
The function is a random number generator, intended for sequence hopping, with a SRS sequence ID as a random seed.
The function is parameterized by SRS sequence ID, scheduled time and frequency location of the SRS sequence.
FFS: sub-time-units for SRS (if supported), SRS sequence generation details. e.g., block wise sequence generation and concatenation (one/multiple roots), long sequence based designs (one root), etc.

A description of an NR SRS contributed to RAN1 #91 is given below.

Remaining discussion on SRS hopping

In previous agreement, NR SRS resource can be transmitted as multiple consecutive symbols $N_{symbol} \in \{1,2,4\}$ located in last six symbols within a slot. NR SRS bandwidth can be only configured with UE specific parameters such as C_srs. B_srs and b_hop with a complete SRS bandwidth table and symbol-wise repetition of a SRS resource within a slot also supported. If we apply the repetition parameter r, counting the number of UE-specific SRS transmissions, denoted by $n_{SRS}$ as LTE, can be as follows.

$$n_{SRS} = \left\lfloor \frac{l'}{r} \right\rfloor = \frac{N_{symbol}}{r} \times \left\lfloor \frac{(n_f \times N_s + n_s)}{T_{SRS}} \right\rfloor.$$

where $N_{symbol} \in \{1,2,4\}$ is the configured number of SRS symbols within a slot, $l' \in \{0,1,2,3\}$ is the re-numbered index(es) based on the configured SRS symbol index(es) within a slot, $T_{SRS}$ is is UE-specific slot periodicity of SRS transmission, $n_s$ is slot index, $n_f$ is frame index. $N_s$ is number of slot in a frame. Note implicit controls by network are possible of intra-slot hopping on/off, repetition symbols on/off and both. For instance, if network configures that number of SRS symbols is 4 and repetition parameter r is 2, it means that repetition of two SRS symbols with intra-slot hopping is on. Or, if network configures that number of SRS symbols is 4 and repetition parameter r is 4, only repetition is on within the slot.

Besides, inter-cell interference randomization in NR SRS is necessary similar to LTE SRS. LTE offers inter-cell interference randomization by enabling one of group hopping and sequence hopping configuration With respective to SRS functionality for group hopping and sequence hopping, we can consider two options as follows.

Alt. 1: Only slot index based function like LTE.
Alt. 2: Function of SRS symbol index, repetition symbol parameter, and/or slot index, e.g., for group hopping pattern:

$$f_{gh}(l', r, n_s) = \begin{cases} 0 & \text{if group hopping is disabled} \\ \left( \sum_{i=0}^{7} c\left(8\left(\left\lfloor \frac{l'}{r} \right\rfloor + n_s \times \left\lfloor \frac{N_{symbol}}{r} \right\rfloor\right)\right) + i\right) & \text{if group hopping is enabled} \\ \cdot 2^i) \bmod 30 \end{cases}$$

For sequence hopping, we can consider similar hopping pattern as above in terms of SRS symbol index, repetition symbol parameter, and/or slot index.

Also, resource-specific SRS sequence ID for initiation of scrambling seed can be used per SRS resource or per SRS resource set in order to apply different sequences between different SRS resources or resource sets.

Proposal #1: It is preferable to reuse sequence hopping mechanism of LTE (i.e. mechanism for grouping hopping ON and sequence hopping OFF, mechanism for group hopping OFF and sequence hopping ON). Proposal #2: With respective to SRS functionality for group hopping and sequence hopping, NR needs to decide one of the following two options:
Alt.1: Only slot index based function like LTE.
Alt.2: Function of SRS symbol index, repetition symbol parameter, and/or slot index.

Description Related to Scrambling Seed

Since the number of NR cell IDs is 1008 which may be represented by $2^{10}$ bits, Cinit of the SRS may be considered based on $$c_{init} = \left\lfloor \frac{n_{ID}^{RS}}{30} \right\rfloor \cdot 2^5 + (n_{ID}^{RS} + \Delta_{ss}) \bmod 30.$$

If $n_{ID}^{SRS} \in \{0,1,2,\ldots,1007\}$ is an SRS ID and is equal to a cell ID value unless the value is not SRS configured by a BS. However, in NR, $n_{ID}^{SRS}$ has been acknowledged as being UE-specifically provided.

Proposal 1:

An SRS sequence ID may have one unique value per SRS resource or one unique value per SRS resource set (group), so that the scrambling initialization value Cinit provided with respect to each SRS resource or each SRS group is differently configured and thus an SRS sequence allocated within each SRS resource or SRS resource set (group) is differently configured. Here, the SRS resource set (group) may be a bundle of resources configured according to an SRS configuration type (e.g., according to CSI acquisition or UL beam management), a set of SRS resources indicated by a common SRI, SRS resources associated with a common CRI and a common synchronization signal block (SSB) ID, or SRS resources indicated by a common UL TCI including these common IDs (a bundle of the common SRI, the common CRI, and the common SSB ID). For example, the common SRI is one resource set ID indicating one SRS resource set (group). The common CRI is one resource set ID indicating one CSI-RS resource set (group). The common SSB ID is one resource set ID indicating one SSB resource set (group). The common UL TCI is a resource set ID consisting of a combination of the common SRI, the common CRI, the common SSB ID indicating the SRS resource set, the CSI-RS resource set, and SSB resource set, respectively.

Description Related to Sequence Hopping

In sequence group number $u=(f_{gh}0+f_{ss}) \bmod 30$, the group hopping pattern $f_{gh}$ may be represented by a function of the following proposals.

Proposal 2:

The group hopping pattern $f_{gh}$ may be represented as a function of an SRS symbol index $l'$ (e.g., $l' \in \{0,1,2,3\}$) reconfigured based on a symbol index in one SRS slot, the number r of SRS repetition symbols, and/or a slot index $n_s$. Therefore, an effect of inter-symbol interference randomization between SRS symbols, repetition symbols, and/or slots may be obtained according to the configured parameters (i.e., $l'$, r, and $n_s$).

For example, the group hopping pattern is given by Equation 2 below.

$$f_{gh}(l', r, n_s) = \begin{cases} 0 & \text{if group hopping is disabled} \\ \left(\sum_{i=0}^{7} c\left(8\left(\left\lfloor \frac{l'}{r} \right\rfloor + n_s \times \left\lfloor \frac{N_{symbol}}{r} \right\rfloor\right)\right) + i\right) \cdot 2^i \bmod 30 & \text{if group hopping is enabled} \end{cases}$$ [Equation 2]

where $N_{srs\_sym}$ is the number of SRS symbols configured in one slot.

The group hopping pattern $f_{gh}(l', r, n_s)$ is configured per SRS resource or per SRS resource set (group).

Proposal 3:

A base sequence number v may be represented as a function of an SRS symbol index l' (e.g., l'∈{0,1,2,3}) reconfigured based on a symbol index in one SRS slot, the number r of SRS repetition symbols, and/or a slot index $n_s$. Therefore, an effect of inter-symbol interference randomization between SRS symbols, repetition symbols, and/or slots may be obtained according to the configured parameters (i.e., l', r, and $n_s$).

For example, the base sequence number v is given by Equation 3 below.

$$v = \begin{cases} c\left(\left\lfloor \frac{l'}{r} \right\rfloor + n_s \times \left\lfloor \frac{N_{srs\_sym}}{r} \right\rfloor\right) & \text{if group hopping is disabled and sequence hopping is enabled} \\ 0 & \text{otherwise} \end{cases}$$ [Equation 3]

The base sequence number v is configured per SRS resource or per SRS resource set (group).

Proposal 4:

When symbol-wise sequence hopping is considered regardless of repetition symbol configuration, the group hopping pattern $f_{gh}$ and the base sequence number v are configured as a value other than a function of the number r of SRS repetition symbols.

For example, the group hopping pattern is given by Equation 4 below.

$$f_{gh}(l', n_s) = \begin{cases} 0 & \text{if group hopping is disabled} \\ \left(\sum_{i=0}^{7} c(8(l' + n_s \times N_{srs\_sym})) + i\right) \cdot 2^i \bmod 30 & \text{if group hopping is enabled} \end{cases}$$ [Equation 4]

The base sequence number v is given by Equation 5 below.

$$v = \begin{cases} c(l' + n_s \times N_{srs\_sym}) & \text{if group hopping is disabled and sequence hopping is enabled} \\ 0 & \text{otherwise} \end{cases}$$ [Equation 5]

Proposal 5:

The BS configures a field capable of being selected from among functions for the group hopping pattern and the base sequence number and UE-specifically provides the configured field to the UE through higher layers L3 (RRC), L2 (MAC-CE), and/or L1 (DCI).

For example, a sequence hopping function field according to a repetition value is as follows.

When a field value is 0, $f_{gh}$ and v are given by Equation 4 and Equation 5, respectively.

$$f_{gh}(l', n_s) = \begin{cases} 0 & \text{if group hopping is disabled} \\ \left(\sum_{i=0}^{7} c(8(l' + n_s \times N_{srs\_sym})) + i\right) \cdot 2^i \bmod 30 & \text{if group hopping is enabled} \end{cases}$$

$$v = \begin{cases} c(l' + n_s \times N_{srs\_sym}) & \text{if group hopping is disabled and sequence hopping is enabled} \\ 0 & \text{otherwise} \end{cases}$$

When the field value is 1, $f_{gh}$ and v are given by Equation 2 and Equation 3, respectively.

$$f_{gh}(l', r, n_s) = \begin{cases} 0 & \text{if group hopping is disabled} \\ \left(\sum_{i=0}^{7} c\left(8\left(\left\lfloor\frac{l'}{r}\right\rfloor + n_s \times \left\lfloor\frac{N_{symbol}}{r}\right\rfloor\right)\right) + i\right) & \text{if group hopping is enabled} \\ \cdot 2^i)\bmod 30 \end{cases}$$

$$v = \begin{cases} c\left(\left\lfloor\frac{l'}{r}\right\rfloor + n_s \times \left\lfloor\frac{N_{srs\_sym}}{r}\right\rfloor\right) & \text{if group hopping is disabled and sequence hopping is enabled} \\ 0 & \text{otherwise} \end{cases}$$

As another example, the sequence hopping function field according to various combination are as follows.

When the field value is 00, $f_{gh}$ and v are given by Equation 4 and Equation 5, respectively.

$$f_{gh}(l', n_s) = \begin{cases} 0 & \text{if group hopping is disabled} \\ \left(\sum_{i=0}^{7} c(8(l' + n_s \times N_{srs\_sym})) + i\right) \cdot 2^i \bmod 30 & \text{if group hopping is enabled} \end{cases}$$

$$v = \begin{cases} c(l' + n_s \times N_{srs\_sym}) & \text{if group hopping is disabled and sequence hopping is enabled} \\ 0 & \text{otherwise} \end{cases}$$

When the field value is 01, $f_{gh}$ and v are given by Equation 4 and Equation 3, respectively.

$$f_{gh}(l', n_s) = \begin{cases} 0 & \text{if group hopping is disabled} \\ \left(\sum_{i=0}^{7} c(8(l' + n_s \times N_{srs\_sym})) + i\right) & \text{if group hopping is enabled} \\ \cdot 2^i)\bmod 30 \end{cases}$$

$$v = \begin{cases} c\left(\left\lfloor\frac{l'}{r}\right\rfloor + n_s \times \left\lfloor\frac{N_{srs\_sym}}{r}\right\rfloor\right) & \text{if group hopping is disabled and sequence hopping is enabled} \\ 0 & \text{otherwise} \end{cases}$$

When the field value is 10, $f_{gh}$ and v are given by Equation 2 and Equation 5, respectively.

$$f_{gh}(l', r, n_s) = \begin{cases} 0 & \text{if group hopping is disabled} \\ \left(\sum_{i=0}^{7} c\left(8\left(\left\lfloor\frac{l'}{r}\right\rfloor + n_s \times \left\lfloor\frac{N_{symbol}}{r}\right\rfloor\right)\right) + i\right) & \text{if group hopping is enabled} \\ \cdot 2^i)\bmod 30 \end{cases}$$

$$f_{gh}(l', n_s) = \begin{cases} 0 & \text{if group hopping is disabled} \\ \left(\sum_{i=0}^{7} c(8(l' + n_s \times N_{srs\_sym})) + i\right) & \text{if group hopping is enabled} \\ \cdot 2^i)\bmod 30 \end{cases}$$

When the field value is 11, $f_{gh}$ and v are given by Equation 2 and Equation 3, respectively.

$$f_{gh}(l', r, n_s) = \begin{cases} 0 & \text{if group hopping is disabled} \\ \left(\sum_{i=0}^{7} c\left(8\left(\left\lfloor\frac{l'}{r}\right\rfloor + n_s \times \left\lfloor\frac{N_{symbol}}{r}\right\rfloor\right)\right) + i\right) & \text{if group hopping is enabled} \\ \cdot 2^i)\bmod 30 \end{cases}$$

$$v = \begin{cases} c\left(\left\lfloor\frac{l'}{r}\right\rfloor + n_s \times \left\lfloor\frac{N_{srs\_sym}}{r}\right\rfloor\right) & \text{if group hopping is disabled and sequence hopping is enabled} \\ 0 & \text{otherwise} \end{cases}$$

That is, in the 2-bit field value, the first bit selects $f_{gh}$ and the second bit selects v. When a bit is 1, a pattern including a symbol repetition factor R for calculation is selected and, when a bit is 0, a pattern excluding the symbol repetition factor R for calculation is selected. Here, the field may also be referred to as pattern selection information. Patterns may be selected by the field value. In this case, 0 or the pattern may be applied according to whether group hopping and sequence hopping are enabled/disabled. Information for selecting enabling or disabling of the group hopping and the sequence hopping may also be referred to as hopping selection information. The hopping selection information may enable either group hoping or sequence hopping or disable both group hoping and sequence hopping.

For example, if the function field value is set to 10, the group hopping pattern is configured to perform group hopping according to repetition symbol configuration and the base sequence number is configured to perform sequence hopping in every SRS symbol regardless of repetition symbol configuration.

FIG. 7 is a block diagram illustrating an SRS transmission procedure of a UE according to an embodiment of the present disclosure.

The SRS transmission procedure of the UE is as follows. The UE receives the number of SRS repetition symbols, group hopping patterns, sequence hopping patterns, pattern selection information, and hopping selection information from a BS (S701). Next, the UE generates an SRS sequence by applying a group hopping pattern and a sequence hopping pattern selected according to the pattern selection information and the hopping selection information (S702). Then, the UE transmits an SRS based on the SRS sequence (S703).

Here, the group hopping patterns may include a group hopping pattern calculated using the number of SRS repetition symbols and the sequence hopping patterns may include a sequence hopping pattern calculated using the number of SRS repetition symbols. The hopping selection information may select enabling or disabling of group hopping and sequence hopping.

FIG. 8 is a block diagram illustrating an SRS transmission procedure of a UE according to another embodiment of the present disclosure.

The SRS transmission procedure of the UE is as follows. The UE receives the number of SRS repetition symbols, group hopping patterns, sequence hopping patterns, pattern selection information, and hopping selection information from a BS (S801). The UE determines whether the pattern selection information selects a group hopping pattern or a sequence hopping pattern calculated using the number of SRS repetition symbols (S802).

When the pattern selection information selects the group hopping pattern or the sequence hopping pattern calculated using the number of SRS repetition symbols, the UE generates an SRS sequence by applying a group hopping pattern and a sequence hopping pattern selected according to the pattern selection information and the hopping selection information (S803) and transmits an SRS based on the SRS sequence, in which the same SRS sequence is applied to the SRS repetition symbols (S804).

Alternatively, when the pattern selection information does not select the group hopping pattern or the sequence hopping pattern calculated using the number of SRS repetition symbols, the UE generates the SRS sequence by applying a group hopping pattern and a sequence hopping pattern selected according to the pattern selection information and the hopping selection information, in which different SRS sequences are applied to the SRS repetition symbols (S806).

FIG. 9 is a block diagram illustrating an SRS reception procedure of a BS according to an embodiment of the present disclosure.

The SRS reception procedure of the BS is as follows. The BS transmits the number of SRS repetition symbols, group hopping patterns, sequence hopping patterns, pattern selection information, and hopping selection information to a UE (S901). Next, the BS receives an SRS based on an SRS sequence generated by applying a group hopping pattern and a sequence hopping pattern selected according to the pattern selection information and the hopping selection information from the UE (S902).

Here, the group hopping patterns may include a group hopping pattern calculated using the number of SRS repetition symbols and the sequence hopping patterns may include a sequence hopping pattern calculated using the number of SRS repetition symbols. The hopping selection information may select enabling or disabling of group hopping and sequence hopping.

FIG. 10 is a block diagram illustrating an SRS reception procedure of a BS according to another embodiment of the present disclosure.

The SRS transmission procedure of the BS is as follows. The BS transmits the number of SRS repetition symbols, group hopping patterns, sequence hopping patterns, pattern selection information, and hopping selection information to a UE (S1001). The BS determines whether the pattern selection information selects a group hopping pattern or a sequence hopping pattern calculated using the number of SRS repetition symbols (S1002).

When the pattern selection information selects the group hopping pattern or the sequence hopping pattern calculated using the number of SRS repetition symbols, the BS receives, from a UE, an SRS sequence generated by applying a group hopping pattern and a sequence hopping pattern selected according to the pattern selection information and the hopping selection information, in which the same SRS sequence is applied to the SRS repetition symbols (S1003).

Alternatively, when the pattern selection information does not select the group hopping pattern or the sequence hopping pattern calculated using the number of SRS repetition symbols, the BS receives an SRS based on the SRS sequence generated by applying a group hopping pattern and a sequence hopping pattern selected according to the pattern selection information and the hopping selection information, in which different SRS sequences are applied to the SRS repetition symbols (S1004).

Hereinafter, an operation of the UE will be described with reference to FIG. 1.

The UE 20 transmitting an SRS includes the processor 21; and the RF unit 23 coupled to the processor 21 to transmit and receive a radio signal. The processor 21 receives the number of SRS repetition symbols, group hopping patterns, sequence hopping patterns, pattern selection information, and hopping selection information through the RF unit 23 from the BS, generates an SRS sequence by applying a group hopping pattern and a sequence hopping pattern selected according to the pattern selection information and the hopping selection information, and transmits an SRS based on the SRS sequence. The group hopping patterns include a group hopping pattern calculated using the number of SRS repetition symbols and the sequence hopping patterns include a sequence hopping pattern calculated using the number of SRS repetition symbols. The hopping selection information selects enabling or disabling of group hopping and sequence hopping.

Hereinafter, an operation of the BS will be described with reference to FIG. 1.

The BS 10 receiving an SRS includes the processor 11; and the RF unit 13 coupled to the processor 11 to transmit and receive a radio signal. The processor 11 transmits the number of SRS repetition symbols, group hopping patterns, sequence hopping patterns, pattern selection information, and hopping selection information through the RF unit 13 to the UE and receives an SRS based on an SRS sequence generated by applying a group hopping pattern and a sequence hopping pattern selected according to the pattern selection information and the hopping selection information from the UE. The group hopping patterns include a group hopping pattern calculated using the number of SRS repetition symbols and the sequence hopping patterns include a sequence hopping pattern calculated using the number of SRS repetition symbols. The hopping selection information selects enabling or disabling of group hopping and sequence hopping.

The present technology relates to a configuration method of applying a sequence initialization value to each resource or each resource set (group of an NR SRS and applying sequence hopping to each SRS symbol or each SRS repetition symbol to minimize or randomize inter-cell interference intra-cell interference. When a BS decodes a received SRS, if SRS repetition symbols are based on the same sequence, energy combining may be efficiently processed. Although there has conventionally been the case in which group hopping or sequence hopping is not applied for simplification, since a small cell is positively used in NR, inter-cell interference in gradually increased. Accordingly, in order to minimize such interference, group hopping and sequence hopping are indispensable and the number of SRS repetition symbols is used to apply hopping, thereby lowering interference and raising efficiency.

The aforementioned embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present disclosure may be carried out in other specific ways than those set forth herein without departing from the spirit and essential characteristics of the present disclosure. The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The methods for transmitting and receiving an SRS and communication devices therefor may be industrially applied to various wireless communication systems including the 3GPP LTE/LTE-A system, the NR (5G) communication system, etc.

The invention claimed is:

1. A method of transmitting a sounding reference signal (SRS) by a user equipment (UE), the method comprising:
receiving a number of SRS repetition symbols, group hopping patterns, sequence hopping patterns, pattern selection information, and hopping selection information from a base station (BS);
generating an SRS sequence by applying a first group hopping pattern and a first sequence hopping pattern selected according to the pattern selection information and the hopping selection information; and
transmitting the SRS based on the generated SRS sequence,
wherein the group hopping patterns include the first group hopping pattern calculated based on the number of SRS repetition symbols,
the sequence hopping patterns include the first sequence hopping pattern calculated based on the number of SRS repetition symbols, and
selecting enabling or disabling of group hopping and sequence hopping is based on the hopping selection information.

2. The method of claim 1, wherein the UE selects enabling of only one of group hopping and sequence hopping based on the hopping selection information.

3. The method of claim 1, wherein based on the first group hopping pattern, calculated using the number of SRS repetition symbols, being selected according to the pattern selection information, a same SRS sequence is applied to the SRS repetition symbols.

4. The method of claim 1, wherein based on the first sequence hopping pattern, calculated using the number of SRS repetition symbols, being selected according to the pattern selection information, a same SRS sequence is applied to the SRS repetition symbols.

5. The method of claim 1, wherein based on the first group hopping pattern, calculated using the number of SRS repetition symbols, and the first sequence hopping pattern, calculated using the number of SRS repetition symbols, not being selected according to the pattern selection information, different SRS sequences are applied to the SRS repetition symbols.

6. A method of receiving a sounding reference signal (SRS) by a base station (BS), the method comprising:
transmitting a number of SRS repetition symbols, group hopping patterns, sequence hopping patterns, pattern selection information, and hopping selection information to a user equipment (UE); and
receiving the SRS based on an SRS sequence generated by applying a first group hopping pattern and a first sequence hopping pattern selected according to the pattern selection information and the hopping selection information,
wherein the group hopping patterns include the first group hopping pattern calculated based on the number of SRS repetition symbols,
the sequence hopping patterns include the first sequence hopping pattern calculated based on the number of SRS repetition symbols, and
selecting enabling or disabling of group hopping and sequence hopping is based on the hopping selection information.

7. The method of claim 6, wherein selecting enabling of only one of group hopping and sequence hopping is based on the hopping selection information.

8. The method of claim 6, The method of claim 6, wherein based on the first group hopping pattern, calculated using the number of SRS repetition symbols, being selected according to the pattern selection information, a same SRS sequence is applied to the SRS repetition symbols.

9. The method of claim 6, wherein based on the first sequence hopping pattern, calculated using the number of SRS repetition symbols, being selected according to the pattern selection information, a same SRS sequence is applied to the SRS repetition symbols.

10. The method of claim 6, wherein based on the first group hopping pattern, calculated using the number of SRS repetition symbols, and the first sequence hopping pattern, calculated using the number of SRS repetition symbols, not being selected according to the pattern selection information, different SRS sequences are applied to the SRS repetition symbols.

11. A user equipment (UE) for transmitting a sounding reference signal (SRS), the UE comprising:
a processor; and
a transmitter and receiver coupled to the processor to transmit or receive a radio signal,
wherein the processor:
receives a number of SRS repetition symbols, group hopping patterns, sequence hopping patterns, pattern selection information, and hopping selection information from a base station (BS) through the receiver, generates an SRS sequence by applying a first group hopping pattern and a first sequence hopping pattern selected according to the pattern selection information and the hopping selection information, and transmits the SRS based on the generated SRS sequence,
the group hopping patterns include the first group hopping pattern calculated based on the number of SRS repetition symbols,
the sequence hopping patterns include the first sequence hopping pattern calculated based on the number of SRS repetition symbols, and
the processor selects enabling of only one of group hopping and sequence hopping based on the hopping selection information.

12. The UE of claim 11, wherein based on the first group hopping pattern, calculated using the number of SRS repetition symbols, being selected according to the pattern selection information, a same SRS sequence is applied to the SRS repetition symbols.

13. The UE of claim 11, wherein based on the first sequence hopping pattern, calculated using the number of SRS repetition symbols, being selected according to the pattern selection information, a and the same SRS sequence is applied to the SRS repetition symbols.

14. A base station (BS) for receiving a sounding reference signal (SRS), the BS comprising:
a processor; and
a transmitter and receiver coupled to the processor to transmit or receive a radio signal,
wherein the processor:
transmits a number of SRS repetition symbols, group hopping patterns, sequence hopping patterns, pattern selection information, and hopping selection information through the transmitter to a user equipment (UE), and receives the SRS based on an SRS sequence generated by applying a first group hopping pattern and a first sequence hopping pattern selected according to the pattern selection information and the hopping selection information from the UE,
the group hopping patterns include the first group hopping pattern calculated based on the number of SRS repetition symbols,
the sequence hopping patterns include the first sequence hopping pattern calculated based on the number of SRS repetition symbols, and
selecting enabling of only one of group hopping and sequence hopping is based on the hopping selection information.

15. The BS of claim 14, wherein selecting application of only one of the first group hopping pattern, calculated using the number of SRS repetition symbols, and the first sequence hopping pattern, calculated using the number of SRS repetition symbols, is based on the pattern selection information.

* * * * *